United States Patent [19]

Eriksson et al.

[11] Patent Number: 5,346,356
[45] Date of Patent: Sep. 13, 1994

[54] FORK-LIFT TRUCK

[75] Inventors: Lars Eriksson, Mantorp; Anders Fransson, Mjölby, both of Sweden

[73] Assignee: BT Industries AB, Mjolby, Sweden

[21] Appl. No.: 6,973

[22] Filed: Jan. 21, 1993

[51] Int. Cl.$^5$ .............................................. B66F 9/00
[52] U.S. Cl. ...................................... 414/631; 414/544
[58] Field of Search .............. 414/631, 632, 633, 634, 414/544

[56] References Cited

U.S. PATENT DOCUMENTS

| | | | |
|---|---|---|---|
| 2,667,985 | 2/1954 | Woughter | 214/670 |
| 2,792,956 | 5/1957 | Bastie | 214/672 |
| 3,381,834 | 5/1968 | Gibson | 214/514 |
| 3,445,019 | 5/1969 | Steinert et al. | 214/671 |
| 3,536,221 | 10/1970 | Goodacre | 414/631 |

FOREIGN PATENT DOCUMENTS

| | | | |
|---|---|---|---|
| 1009562 | 5/1957 | Fed. Rep. of Germany | 414/631 |
| 1290085 | 2/1965 | Fed. Rep. of Germany | |
| 1177307 | 4/1959 | France | |
| 1230686 | 9/1960 | France | |
| 8300147 | 1/1983 | Netherlands | |
| 345437 | 5/1972 | Sweden | |
| 421821 | 4/1967 | Switzerland | |
| 793972 | 4/1958 | United Kingdom | |
| 920102 | 3/1963 | United Kingdom | |
| 1407286 | 9/1975 | United Kingdom | 414/633 |

Primary Examiner—Richard A. Schacher
Attorney, Agent, or Firm—Roylance, Abrams, Berdo & Goodman

[57] ABSTRACT

A materials-handling fork-lift truck comprising a chassis (11) which is fitted with two forwardly extending, mutually parallel support legs (18), and a chassis-mounted lifting mast assembly (16) provided with a raisable and lowerable lifting fork (17). The lifting mast assembly can be moved along the support legs (18), between a first, mast-withdrawn position and a second, mast-extended position, in which the lifting fork is located close to the outer ends (19) of the support legs. The lifting mast assembly (18) is intended to be supported on the support legs (18), and a linkage mechanism (20) is provided for effecting movement of the mast assembly along the support legs. The linkage mechanism is also intended to constitute a horizontal support for the mast assembly (16).

11 Claims, 2 Drawing Sheets

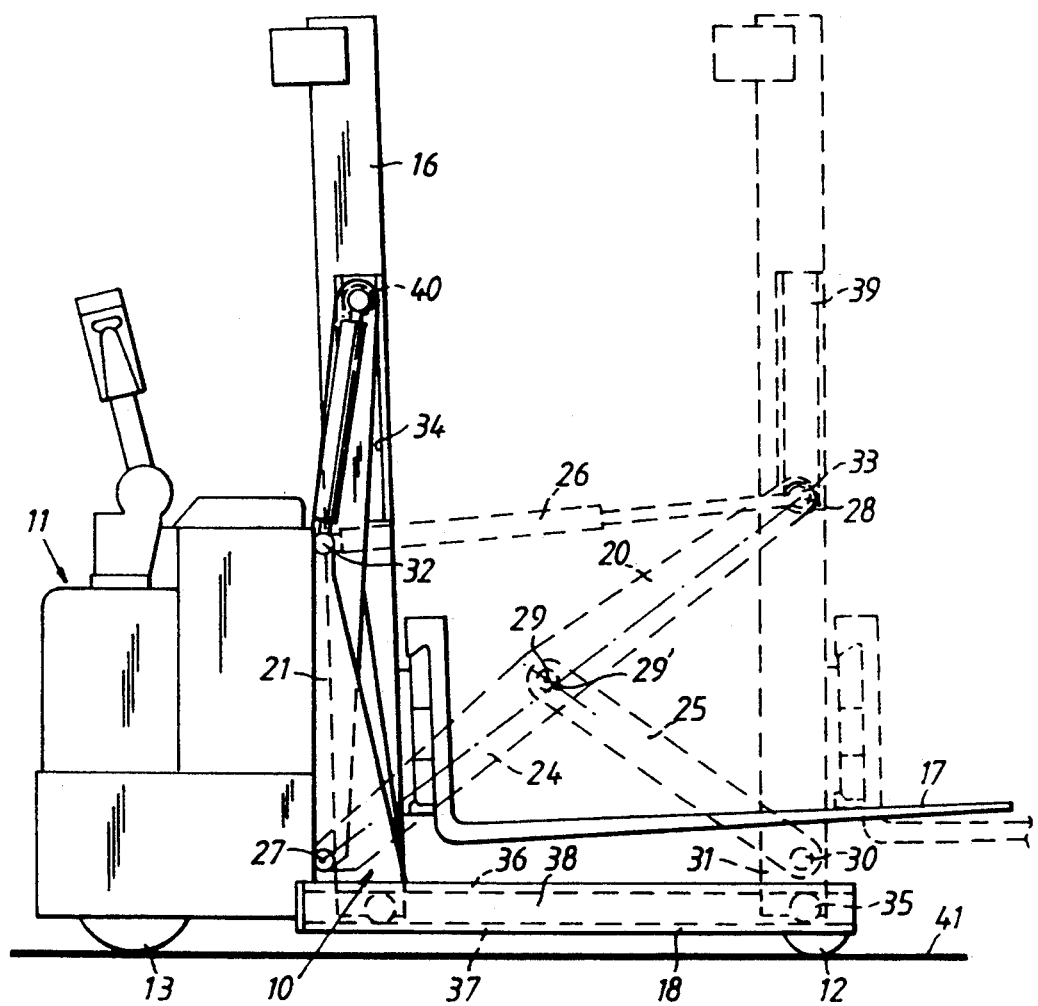

FORK-LIFT TRUCK

The present invention relates to a materials-handling fork-lift truck comprising a chassis which includes two forwardly extending and mutually parallel support legs, and a chassis-mounted lifting mast assembly which includes a raisable and lowerable lifting fork, said lifting mast assembly being displaceable along the support legs between a first withdrawn position and a second extended position in which the lifting fork is located close to the outer ends of the support legs.

Fork-lifts belonging to one known category of trucks of this kind are often referred to as sliding frame trucks or sliding mast trucks. To some extent, these trucks combine the advantages afforded by leg supported trucks and counter-balance trucks and, among other things, enable the trucks to work in narrow passageways and corridors while, at the same time, enabling the obstructive effect of the support legs to be avoided when carrying out other types of loading and offloading work. The trucks have heavily dimensioned support legs which accommodate beams for supporting and guiding a displacement carriage. The mast assembly is mounted on this carriage and the carriage transfers to the support legs all forces and torque exerted by the mast onto the to the carriage. Consequently, the support legs of such trucks become excessively large and too high to be driven in beneath standard pallets in the manner of normal leg supported trucks. The support legs are therefore spaced apart sufficiently to enable the legs to straddle the pallets.

Normal leg supported trucks are of a simpler and lighter construction and the support legs are sufficiently low to enable them to be driven in beneath standard pallets. As a rule, these trucks are more advantageous for purely internal material handling operations and may therefore be combined with dissliding frame trucks or counter-balance trucks that can be used when working on loading piers or platforms and when loading and offloading goods onto and from lorries, trucks and the like, where the vehicle wheels often present an obstacle to the support legs. With the intention of avoiding the aforesaid drawback of leg supported trucks, it has been suggested, e.g., in U.S. Pat. No. 3,381,834 that a fork-extending mechanism is fitted between the fork carriage and the lifting forks. This mechanism would allow the lifting forks to be extended beyond the support legs when necessary, despite the fact that the lifting mast remains fixedly mounted in the chassis. The fork-extending mechanism, however, is subjected to high torque forces and must therefore be dimensioned accordingly. The construction also becomes large and heavy and since the mechanism must accompany the fork carriage as it moves along the mast, the intrinsic weight is very large, therewith resulting in high energy consumption among other things. Another drawback with this known mechanism is that additional hydraulic lines are required up in the mast and the mast must, of course, be dimensioned to withstand the large forces generated by the load.

Accordingly, one object of the present invention is to combine the advantages afforded by leg supported trucks and sliding mast trucks in a more efficient manner than has hitherto been achieved, so as to provide a lighter and simpler sliding mast truck. Another object is to provide a truck of this kind in which the mast and support-leg dimensions can be held within generally the same magnitude as the dimensions of a corresponding leg supported truck having a fixedly mounted mast. Other objects of the invention and advantages afforded thereby will be evident from the following description. These objects are achieved with a fork-lift construction having the characteristic features set forth in the following claims.

The invention is based on the realization that similar to earlier known sliding mast trucks, the mast should be displaceable so that energy consumption and construction problems will not be too great, but instead of being fixedly mounted in the support legs, the mast should move freely on the legs and be held in a stable vertical position with the aid of a linkage mechanism mounted between the mast and the chassis. The linkage mechanism will conveniently consist of some form of pantographic mechanism or scissor-like mechanism which is able to move the mast on the support legs in parallel motion without the legs being subjected to forces other than purely vertical forces. This enables the support legs to be given much smaller, or weaker, dimensions and, in some cases, a low construction height so as to enable the legs of leg supported trucks to be driven in beneath standard pallets in a conventional manner. The lateral support achieved via the linkage mechanism enables the support legs to be fixedly mounted to the truck frame or truck chassis in a manner corresponding to conventional leg supported trucks, i.e. without requiring the support legs to be constructed from frame beams which also extend into that part of the truck in which the engine and operating equipment are located. The invention thus enables the truck to be constructed rationally on a module-based method, in which that part of the truck which houses the engine and the operating equipment can be manufactured separately from the support leg assembly and then fitted to the support leg assembly at some later stage. The engine and operating unit may also be used for both sliding mast trucks and conventional leg supported trucks.

The invention will now be described in more detail with reference to tile accompanying drawings, in which FIG. 1 is a side view of an inventive truck with the mast assembly withdrawn;

FIG. 4 is a side view of an alternative embodiment, in this case a pedestrian controlled truck, with the mast assembly being shown in its withdrawn position in full lines and in its extended position in broken lines.

Figure 1:
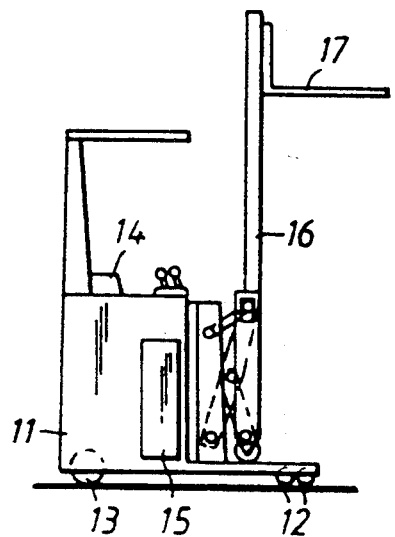
Figure 2:
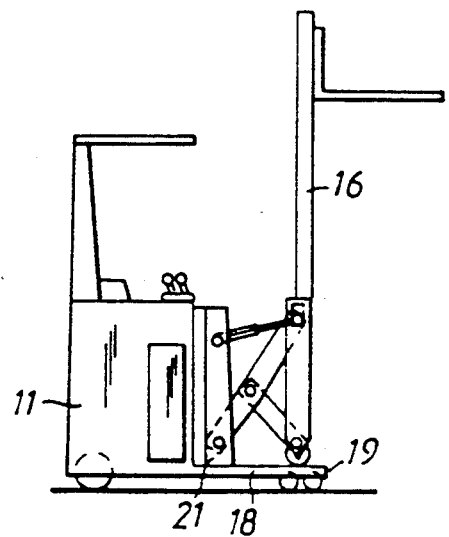
FIG. 2 is a corresponding view of the truck with the mast assembly extended.

The truck illustrated in FIG. 1 is a battery-driven leg-supported truck and comprises conventionally a chassis 11 which is carried on front and back wheels 12, 13. Mounted on the chassis is a driving place 14, a battery pack 15 which powers the travelling and lifting functions of the truck, and a lifting mast assembly 16 equipped with a raisable and lowerable lifting fork 17. The chassis include two mutually parallel and forwardly extending support legs 18 and the front wheels 12 are mounted on the outer ends 19 of the support legs 18. Each of the front wheels 12 preferably comprises a double wheel-pair, so as to reduce wheel pressure while retaining wheels of small dimensions. The lifting mast assembly 16 can be displaced along the support legs 18 with the aid of a linkage mechanism 20. This linkage mechanism includes a first upstanding, stationary frame part 21 which is fixedly mounted in the chassis 11 at the inner end 22 of the support legs 18, and a second upstanding frame part 23 which is attached to the mast assembly 16 or forms a part thereof. The linkage mechanism has the form of a pantograph or scissor-like mechanism and also includes a first strut 24, a second strut 25 which is shorter than the first strut 24, and a hydraulic piston-cylinder device 26. The first strut 24 is mounted between a first attachment point 27 on the first upstanding frame part 21 and a second attachment point 28 on the second upstanding frame part 23, said second attachment point being higher than the first attachment point 27. The second, shorter strut 25 is attached between the first strut 24 and the second upstanding frame part 23, more specifically between a first attachment point 29 provided generally midway on the first strut 24, and a second attachment point 30 provided beneath the first attachment point 29 and connecting with the bottom end or mast foot 31 of the second upstanding frame part 23. The hydraulic piston-cylinder device 26 is mounted between a first attachment point 32 on the upstanding frame part 21, which point is located above the first attachment point 27 of the first strut 24 and a second attachment point 23 on the second upstanding frame part 23, said attachment point 33 coinciding with the second attachment point 28 of the first, lower strut 24 and forming a common attachment point. This common attachment point 28, 33 is able to move along a slot 34 extending longitudinally in the frame part 23, as the mast assembly 16 is moved between the withdrawn position shown in FIG. 1 and the extended position shown in FIG. 2. The bottom end 31 of the frame part 23, and therewith the bottom end of the entire mast assembly, rests on a runner 35 mounted on the frame part and running along respective support legs 18. The whole of the pantograph mechanism 21 is generally symmetrical with respect to the support legs 18, so that a respective frame part 23, struts 24, 25 and a hydraulic piston-cylinder device 26 will be disposed above each support leg.

Figure 3:
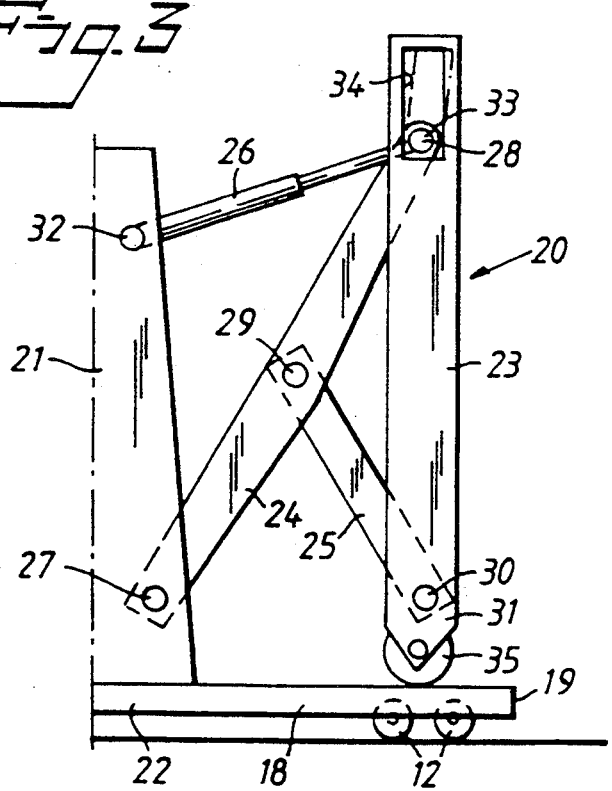
FIG. 3 is a detailed view of the mast-extending mechanism.

The mast assembly 16 will normally lie close to or be in abutment with the upstanding frame part 21 in front of the driving place 14 when the truck is in its original starting position, i.e. with the mast withdrawn as illustrated in FIG. 1. With the mast in this position, the truck is able to function as a conventional leg supported truck and the low height of the support legs can be utilized to improve manoeuvering of the truck in confined spaces. With the lifting fork 17 in its bottom position adjacent the support legs 18, the height or vertical extension of the support legs, including respective fork tines, will preferably not exceed 150 mm, so as to enable EUR-pallets and the like to be lifted readily from the surface supporting said pallets. The lifting mast assembly 16 is extended to the position shown in FIG. 2 with the aid of the hydraulic piston-cylinder device 26, which moves the attachment point 28, 33 common to the piston-cylinder device and the first strut 24 forwardly in the direction of the support legs. At the same time, this common attachment point is moved down in the slot 34, from an upper position, shown in FIG. 1, to a stop position, shown in FIGS. 2 and 3.

As the common attachment point moves, the mast assembly 16 is held constantly vertical by means of the second strut 25, which urges the mast foot 31 forwards at the same speed as the earlier mentioned attachment point 28, 33 moves in the slot. During this movement, the mast assembly rests on the runner 35, which rolls forwards along its associated support leg up to the illustrated end position, in which the mast is located vertically above the front wheel-pair 12. With the mast in this position, the truck has been converted to a counterbalance truck and can be driven into the close proximity of loading piers, trucks and the like without being obstructed by the forwardly extending support legs. The lifting fork 17 can also be lowered down to ground level for handling goods which are not carried by pallets. The power and force transmission between the mast assembly 16 and the truck chassis 11 is highly favourable even in the extended position of the mast, since vertical loads will act directly on the front wheels 12 of the truck while the relatively narrow support legs 18 are protected from horizontal forces by the freely mounted runners 35. Any torque generated is, instead, taken-up by the struts 24, 25 and the hydraulic piston-cylinder device 26, which can be given the necessary dimensions more readily without impairing the desired function of the truck.

The illustrated pantograph mechanism 20 is particularly advantageous in this respect, since the long, first strut 24 provides a natural stable mast-assembly attachment, whereas the second, shorter strut 24 can be given stationary and therewith stable attachment points 29, 30 in the absence of any play. If so desired, the slot 34 in the mast assembly may be inclined slightly or curved in a vertical direction, as indicated in chain lines in FIG. 3. For instance, when the slot is inclined forwardly, the mast assembly will tilt rearwardly in its withdrawn position.

The truck illustrated in FIG. 4 has a slightly modified mast and support leg assembly which is mounted on the chassis of a pedestrian controlled truck. Those truck components which correspond to the components illustrated in FIGS. 1-3 have been identified by like reference numerals. The FIG. 4 embodiment shows that the inventive mast and support leg assembly can be used very effectively with small, lightweight pedestrian controlled trucks. An engine and manoeuvering unit 11 of the same construction as that used for conventional leg supported trucks forms a base unit in this case, whereas the mast 16, linkage mechanism 20 and support legs 18 form a mast and leg-supported module which is fitted to the base unit. The two units are conveniently assembled with the aid of bolt connections (not shown) between the upstanding frame part 21 and chassis parts (not shown) of the engine and manoeuvering unit 11. The frame part 21 and the support legs 18 are welded to one another and form a carrier frame for the mast 16 and the linkage mechanism 20.

Each support leg 18 is comprised of a U-beam with horizontal flanges 36, 37 and a vertical web 38. The runner 35 on the bottom end 31 of the mast is intended to rest on the bottom flange 37 and to roll therealong as the mast is moved. The upper flange projects out over the runner 35 so as to protect the runner and to assist in guiding the runner effectively along the beam. In this embodiment, the slot 34 is formed by a U-shaped section 39. A guide roller 40 mounted on the common connection point or node 28, 33 is guided for movement between the flanges of the U-shaped section 39.

The pantograph mechanism 20 functions to hold the mast 16 generally vertical, i.e. perpendicular to the support legs 18 in the forwardly displaced position of the mast, and slightly tilted rearwardly in the withdrawn position of the mast. In the illustrated embodiment, this is achieved by making the distance between the first and the second attachment points 29 and 30 respectively on the second strut 25 slightly longer than the distance between said attachment point 29 and the second attachment point 28 on the first strut 24. More specifically, the attachment point 29 common to said struts has been moved about 5–10 mm in the longitudinal direction of the second strut away from the straight line between the outer attachment points 27 and 28 of the first strut, i.e. away from the point 29', resulting in total parallel movement of the mast This solution enables the mast to be tilted rearwardly through about 1–3 degrees, thereby enabling the truck to be driven safely without risk of losing a load. In the forwardly displaced position of the mast, the lifting fork is completely parallel with the foundation 41 on which the truck is driven, so that the fork can be readily inserted beneath loads, and also beneath loads which are not carried by pallets.

What we claim is:

1. A materials-handling fork-lift truck, comprising:
    a chassis having two forwardly extending and mutually parallel support legs;
    a chassis-mounted lifting mast assembly having a raisable and lowerable lifting fork; and
    a linkage mechanism arranged for displacing said lifting mast assembly along the support legs between a first withdrawn position and a second extended position in which the lifting fork is located close to the outer extremities of the support legs, the lifting mast assembly being freely supported on the support legs, said linkage mechanism being a pantograph mechanism including
        a first strut being pivotally mounted between an upstanding frame part on the truck chassis and the lifting mast assembly,
        a second strut shorter than the first strut being pivotally mounted between the first strut and the mast assembly, and
        a hydraulic piston-cylinder device arranged for moving the struts and displacing the lifting mast assembly.

2. A fork-lift truck according to claim 1 wherein
    the linkage mechanism is constructed to transfer the horizontal forces from the mast assembly to the truck chassis so that said support legs will only be subjected to vertical forces from the mast assembly.

3. A fork-lift truck according to claim 1, wherein
    at least two runners are mounted on the foot of the mast assembly and lying in engagement with and running along each of the support leg.

4. A fork-lift truck according to claim 1, wherein
    the lifting mast assembly, the support legs, the pantograph mechanism and the upstanding frame part together form a first module;
    and said fork-lift truck further comprises a truck engine and a maneuvering unit which together form a second module; and
    the firs and second modules are constructed to be separately manufactured and assembled at a later stage.

5. A fork-lift truck according to claim 1, wherein
    the hydraulic piston-cylinder device is mounted between said frame part and the mast assembly, and
    the first strut has a first attachment point in said upstanding frame part and a second attachment point in the mast assembly, said second attachment point being higher than the first attachment point.

6. A fork-lift truck according to claim 5, wherein
    the hydraulic piston-cylinder device is mounted between a first attachment point on said upstanding frame part, said first attachment point of the hydraulic piston-cylinder device being located at a higher level than the first attachment point of the first strut, and
    the hydraulic piston-cylinder device is mounted at a second attachment point which coincides with the second attachment point of the first strut.

7. A fork-lift truck according to claim 6, wherein
    the second attachment points of the first strut and of the hydraulic piston-cylinder device are intended to move along a slot which extends longitudinally in the mast assembly between a first, lower position in the slot when the mast assembly is extended, and a second, higher position when the mast assembly is withdrawn.

8. A fork-lift truck according to claim 1, wherein the linkage mechanism is intended to hold the mast assembly generally vertical when the mast is in its extended position, and to hold the mast rearwardly inclined when the mast is in its withdrawn position.

9. A materials-handling fork-lift truck, comprising:
    a truck chassis having a truck engine, a maneuvering unit, an upstanding frame part, and two forwardly extending and mutually parallel support legs;
    a chassis-mounted lifting mast assembly having a raisable and lowerable lifting fork, and at least two runners mounted on the foot of said mast assembly for lying in engagement with and running along each of said support leg; and
    a linkage mechanism arranged for displacing said lifting mast assembly along said support legs between a first withdrawn position and a second extended position in which said lifting fork is located close to the outer extremities of said support legs, said lifting mast assembly being freely supported on said support legs, said linkage mechanism being constructed to transfer the horizontal forces from said lifting mast assembly to the chassis so that said support legs will only be subjected to vertical forces from said lifting mast assembly, said lifting mast assembly being a pantograph mechanism including
        a first strut being pivotally mounted between said upstanding frame part on the truck chassis and the lifting mast assembly,
        a second strut being pivotally mounted between the first strut and the mast assembly, and
        a hydraulic piston-cylinder device being mounted between said upstanding frame part and said lifting mast assembly for moving the struts and displacing the lifting mast assembly,
    the lifting mast assembly, the support legs, the pantograph mechanism and the upstanding frame part together form a first module, and said truck engine and said maneuvering unit together form a second module with the first and second modules being constructed as separately manufactured and assembled at a later stage,
    said first strut having a first attachment point in said upstanding frame part and a second attachment point in the mast assembly, said second attachment point being higher than the first attachment point, the hydraulic piston-cylinder device being mounted between a first attachment point on said upstanding frame part, said first attachment point of the hydraulic piston-cylinder device being located at a higher level than the first attachment point of said first strut, and the hydraulic piston-cylinder device being mounted at a second attachment point which coincides with the second attachment point of the first strut.

10. A fork-lift truck according to claim 9, wherein the second attachment points of the first strut and of the hydraulic piston-cylinder device move along a slot which extends longitudinally in the mast assembly between a first, lower position in the slot when the mast assembly is extended, and a second, higher position when the mast assembly is withdrawn.

11. A fork-lift truck according to claim 10, wherein the linkage mechanism holds the mast assembly generally vertical when the mast is in its extended position, and to hold the mast rearwardly inclined when the mast is in its withdrawn position.

* * * * *